INVENTORS.
WILLIAM H. DUNN
CURT F. FEY
LAVEEN N. KANAL
WILLIAM L. McDERMID
DONALD F. SMITH
BY
T. L. Styner
ATTORNEY Sept. 27, 1966 W. H. DUNN ETAL 3,275,985

PATTERN RECOGNITION SYSTEMS USING DIGITAL LOGIC

Filed June 14, 1962 15 Sheets-Sheet 2

Sept. 27, 1966 W. H. DUNN ETAL 3,275,985

PATTERN RECOGNITION SYSTEMS USING DIGITAL LOGIC

Filed June 14, 1962

15 Sheets-Sheet 5

Sept. 27, 1966 W. H. DUNN ETAL 3,275,985

PATTERN RECOGNITION SYSTEMS USING DIGITAL LOGIC

Filed June 14, 1962 15 Sheets-Sheet 8

3,275,985
PATTERN RECOGNITION SYSTEMS USING DIGITAL LOGIC

William H. Dunn, Red Bank, N.J., Curt F. Fey, Chevy Chase, Md., and Laveen N. Kanal and William L. McDermid, Rochester, and Donald F. Smith, Pittsford, N.Y., assignors to General Dynamics Corporation, Rochester, N.Y., a corporation of Delaware Filed June 14, 1962, Ser. No. 202,525
15 Claims. (Cl. 340—146.3)

This invention relates to pattern recognition systems and is particularly directed to methods and circuits for classifying groups of randomly arranged binary digits. The pattern recognition systems of this invention comprises binary operated networks which are capable of being "taught" to recognize and classify each of many distinct patterns.

A "pattern" as used throughout this disclosure means a group of two-valued electrical signals which can be "read" simultaneously or successively and the spacial or serial arrangement of which can be assigned meaningful classifications. The "pattern" contemplated here may comprise, for example, a two dimensional array of black and white incremental areas of a picture image familiar to the facsimile and television arts; or the "pattern" may comprise a group of arbitrary binary digits, without spacial or picture significance, familiar to the card sorting art. In either case, the pattern may be read optically, electrically, or mechanically. For example, a raster or grid of light sensitive cells analogous to the rods and cones of the human retina for sampling the incremental areas of the image pattern are examples of sensing devices which can be employed here. Conventional single-pole switches can, of course, simulate the cells.

The resolving power of the reading assembly or retina is determined by the number of sensing elements and the size of the incremental areas viewed by each element. Since binary or two-valued voltages and/or currents are most conveniently treated in the circuits of this invention, each incremental area of the pattern must be interpreted as either black or white.

If a raster is considered having 1024 sensing elements in a 32 x 32 grid, the maximum possible number of distinct patterns that can be read is the astronomical figure of $2^{1024}$. Circuitry for reliably reading and reporting out such a large number of patterns by the usual computer circuitry is economically unfeasible.

Accordingly, an object of this invention is to provide an improved and simplified and economically feasible pattern recognition system.

The series of articles in the "Proceedings of the Institute of Radio Engineers" for January 1961 reviews the pattern recognition art and the article by Hawkins on pages 31 to 48 is particularly pertinent to the art of recognition and learning networks. In this article, the terms "learning" and "teaching" have been used to indicate the procedures for preconditioning the pattern recognition circuitry so that a single distinct output signal will always result for each one of many patterns that may be presented to the sensing elements of the network. It has been attempted by computation and long trial and error and by "hill-climbing" techniques to find random circuit connections and fixed parameters which will correctly classify a number of patterns. Unfortunately, these procedures for finding the right network to recognize a modest number of patterns, such as the principal fonts of upper and lower case letters of the English alphabet, are impractically long and costly.

Accordingly, another object of this invention is to provide a pattern recognition system which can be rapidly preconditioned, or taught, to reliably classify each of many patterns.

The objects of this invention are achieved in a system comprising an array of sensing elements each of which will yield either of two voltages. The sensing elements may be arranged in two dimensions for picture recognition or may be arranged arbitrarily, as for card-reading. The system also comprises a plurality of groups of storage devices, or "stores," each store being capable of containing and retaining an electrical weight or quantity, such as an electrostatic charge, or an electrical current, voltage or impedance, or a degree of mechanism. The weight may be measured in analog terms or, preferably, as a coded binary number. Each store is capable of retaining its electrical contents without deterioration, during read-in and read-out. The numerical value of the contents of each store will hereinafter be referred to as "weights." All stores of one group are controlled by one sensing element, the number of stores in each group being determined by the number of significant places which will be employed in a coded binary read-out number. Following the stores are a series of adders. The inputs of the adders are connected to one store of each of said groups of stores so that the contents of the connected stores may be added in a prescribed manner. Only those stores which have been enabled by one of the two stable states of a connected sensing element may contribute to the addition. The adders handle both positive and negative numbers. In the preferred embodiment, an adjustable number, identified below by M, is introduced to the adder to bias the adder results and later facilitates certain numerical comparisons. The results of the additions are next compared against threshold values. Preferably, two threshold values are utilized for each output, one being of larger value than the other. If the adder result is higher than the larger value of the two threshold values, a "one" is transferred to the coded output register. If the adder value is lower than the lowest threshold value, a "zero" is transferred to the coded output register. If the adder value lies between the two threshold values, a reject signal results. The "ones" and "zeros" comprise the coded binary outputs of the system.

It has been found feasible to compute on a high speed commercial computer, of the IBM Model 704 type, the weights or electrical contents of each of the stores connected to a finite number of sensing elements for recognizing and classifying each of a finite number of patterns. According to one embodiment, described in detail below, one adder is employed for successively performing the several additions, gating and timing circuits being used to successively connect the outputs of the proper stores to the adder.

According to another important feature of this invention, the above system may be made self-teaching. This is accomplished by feedback circuits to reinforce by addition to and subtraction from the value of the weights standing in the stores. The decision to reinforce is determined by first comparing the result of the summation of the stored weights with the two threshold numbers. Such comparison yields a 1, 0, or X, depending on whether the storage summation is, respectively, greater than, less than, or between the two threshold values. The 1, 0 or X is then compared with the 1 or 0 desired at the output. If the threshold comparison result is 1 and the desired output is 1, or if the threshold comparison is 0 and the desired output is 0, no reinforcement is desired and no feedback occurs. If the threshold comparison is 1 or X and the desired value is 0, reinforcement is desired and a pulse is fed back to reduce by 1 the value of the contents of each store involved in the addition. If the threshold comparison is 0 or X and the desired value is 1, reinforcement is desired and a pulse is fed back to increase the value of the contents of each involved store.

In the "learning" mode, all patterns are successively presented, and at the same time all desired adder outputs are presented, and repeatedly presented iteratively, and reinforcements of stores are iteratively made until all actual and all desired adder outputs match. It has been found that in the completely connected circuits of this invention, the weights in the stores rapidly converge and that a finite number of "lessons" are required to teach the device to recognize a given number of patterns. Convergence of the adaptive fixed-circuit networks is treated mathematically in the copending application, Serial No. 202,529, filed on the filing date of this application.

Other objects and features of this invention will become apparent to those skilled in the art by referring to specific embodiments described in the following specification and shown in the accompanying drawings, in which.

Figures 3, 8:
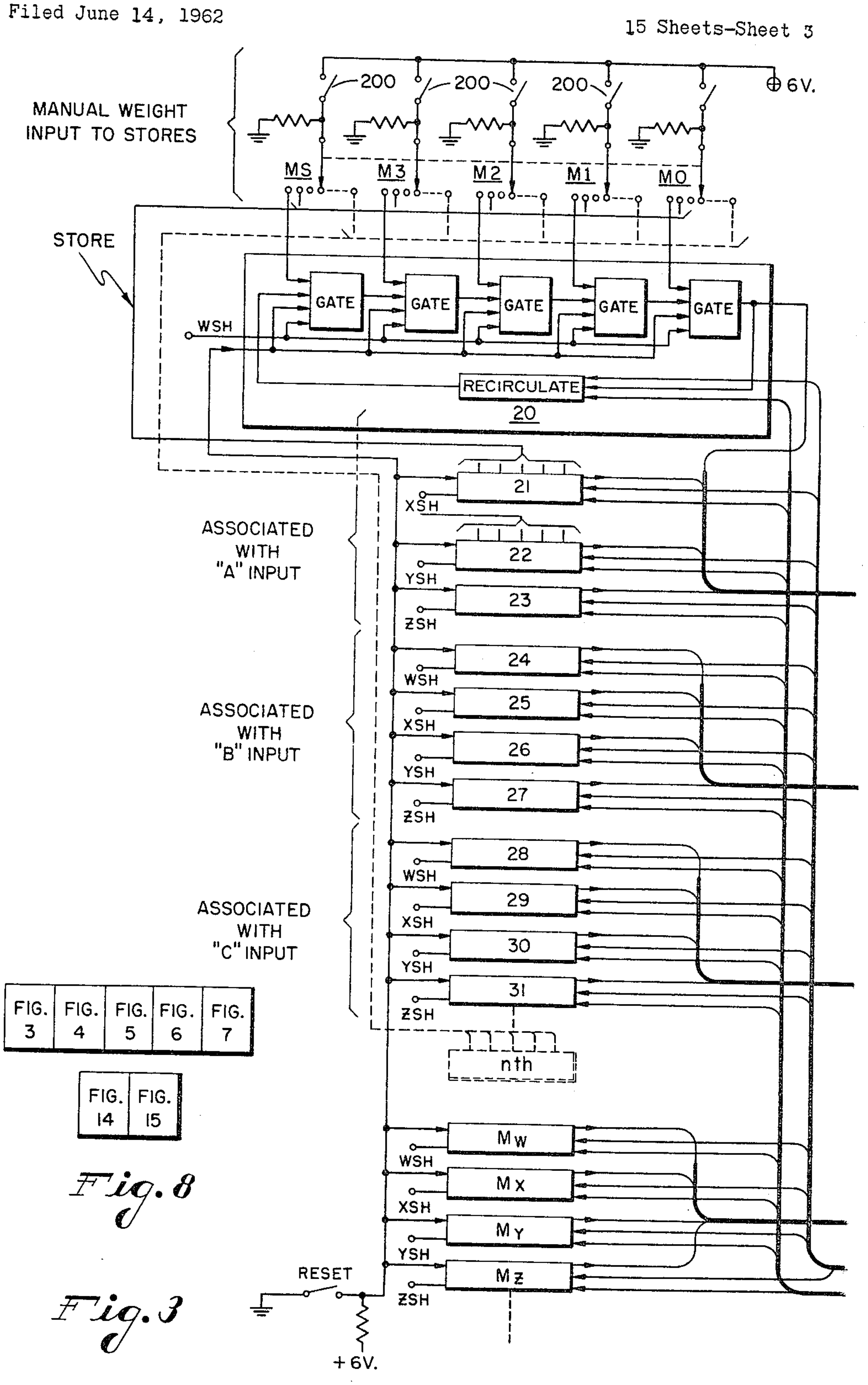
Figure 4:
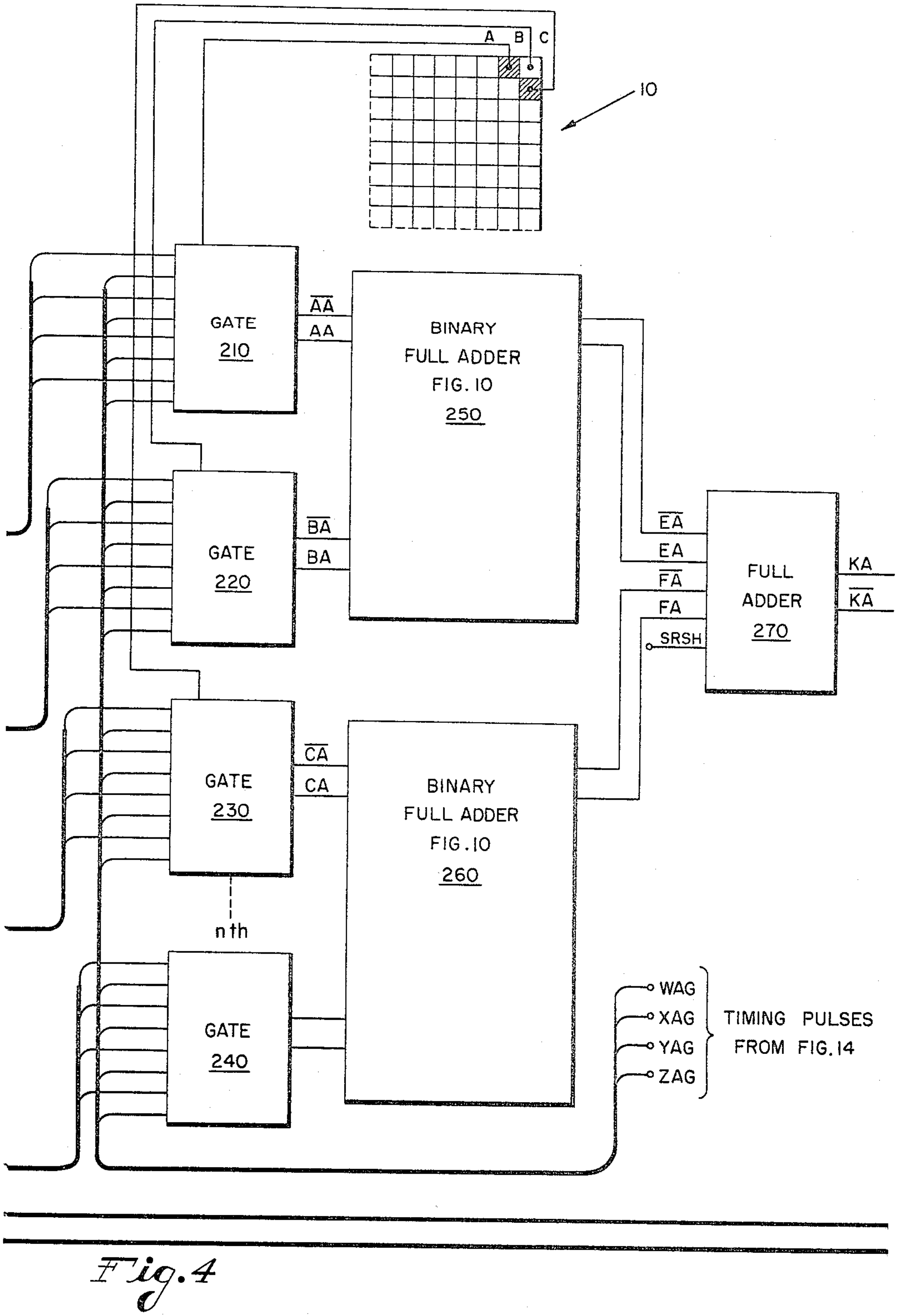
Figure 5:
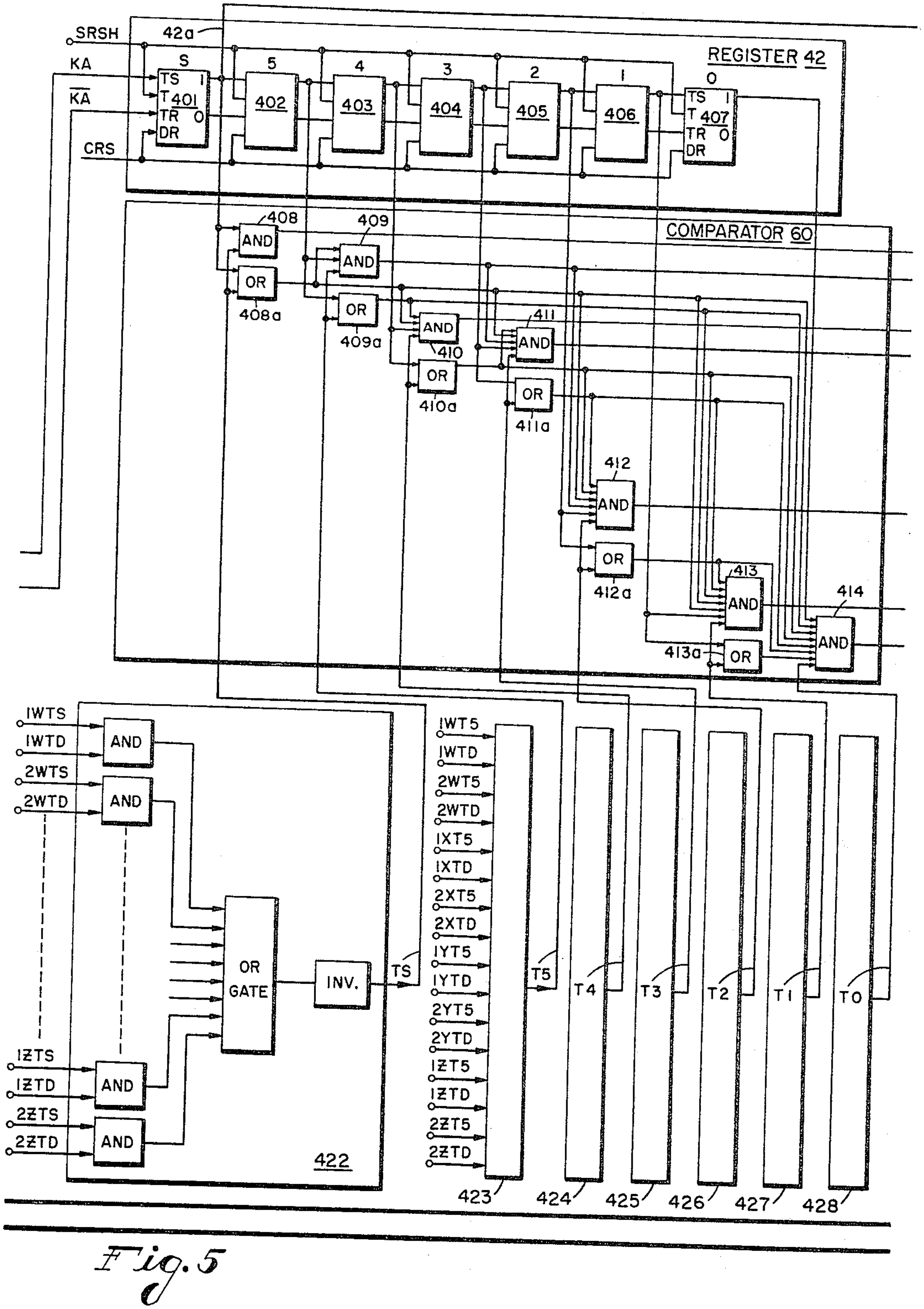
Figure 7:
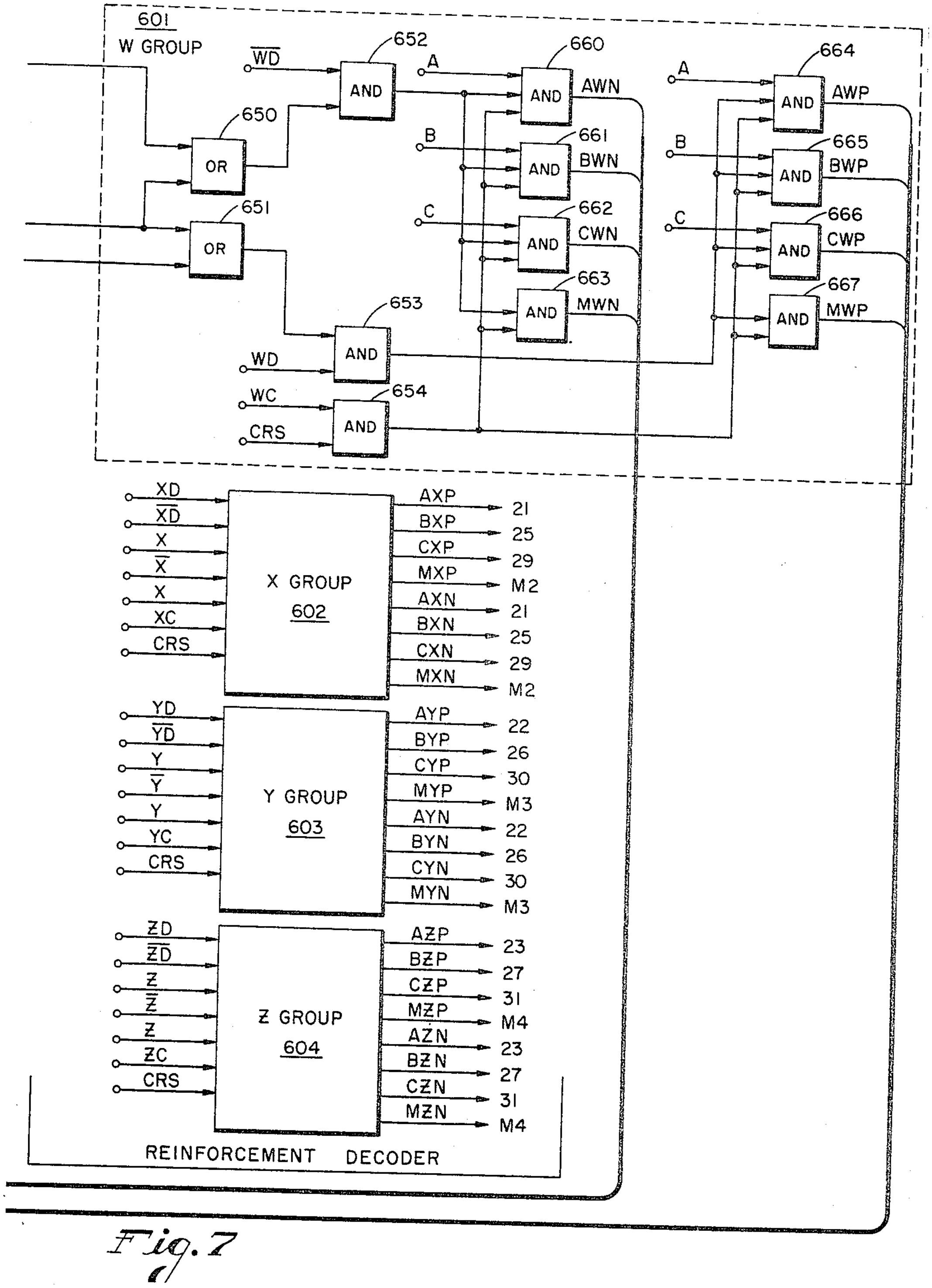
Figure 9:
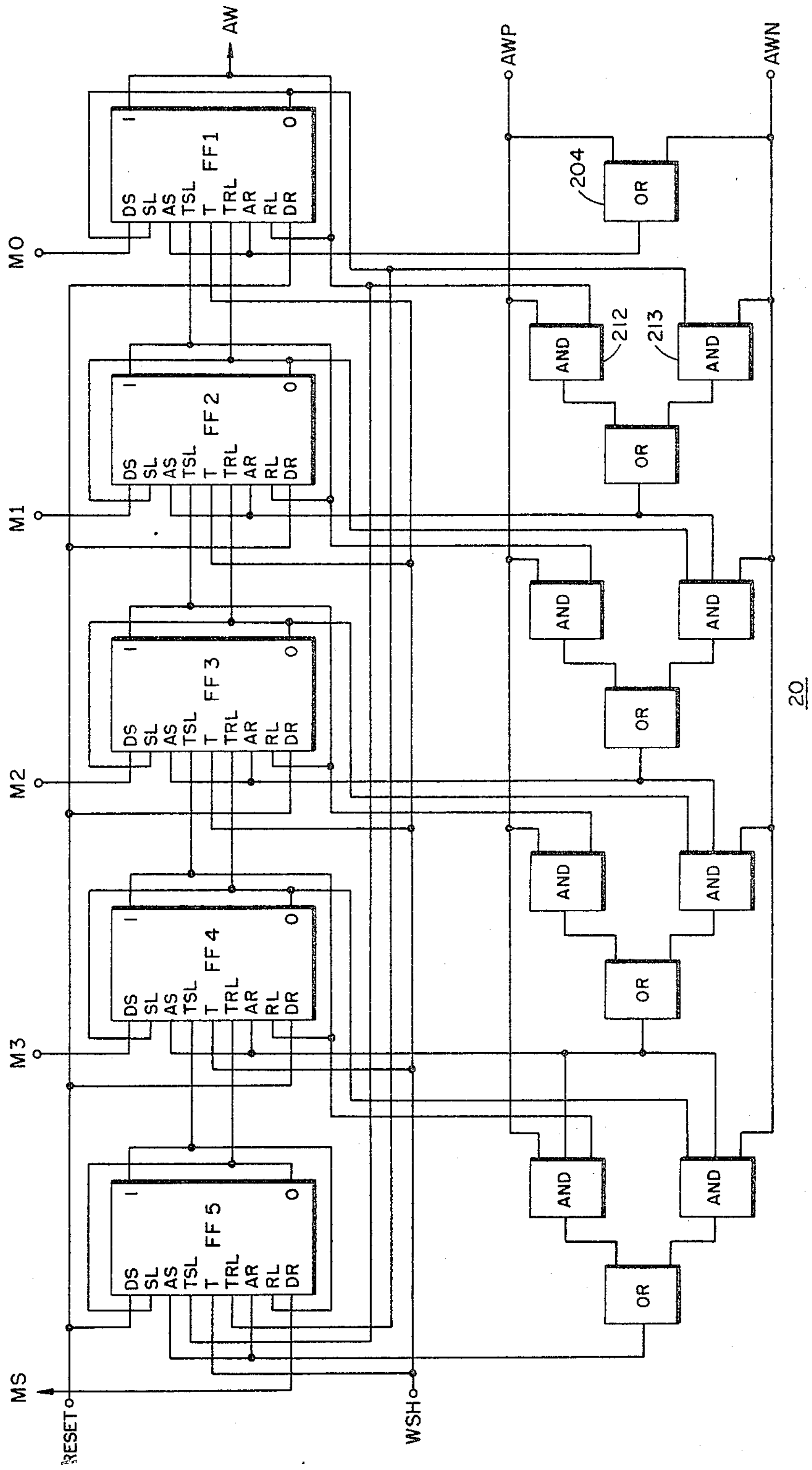
Figure 10:
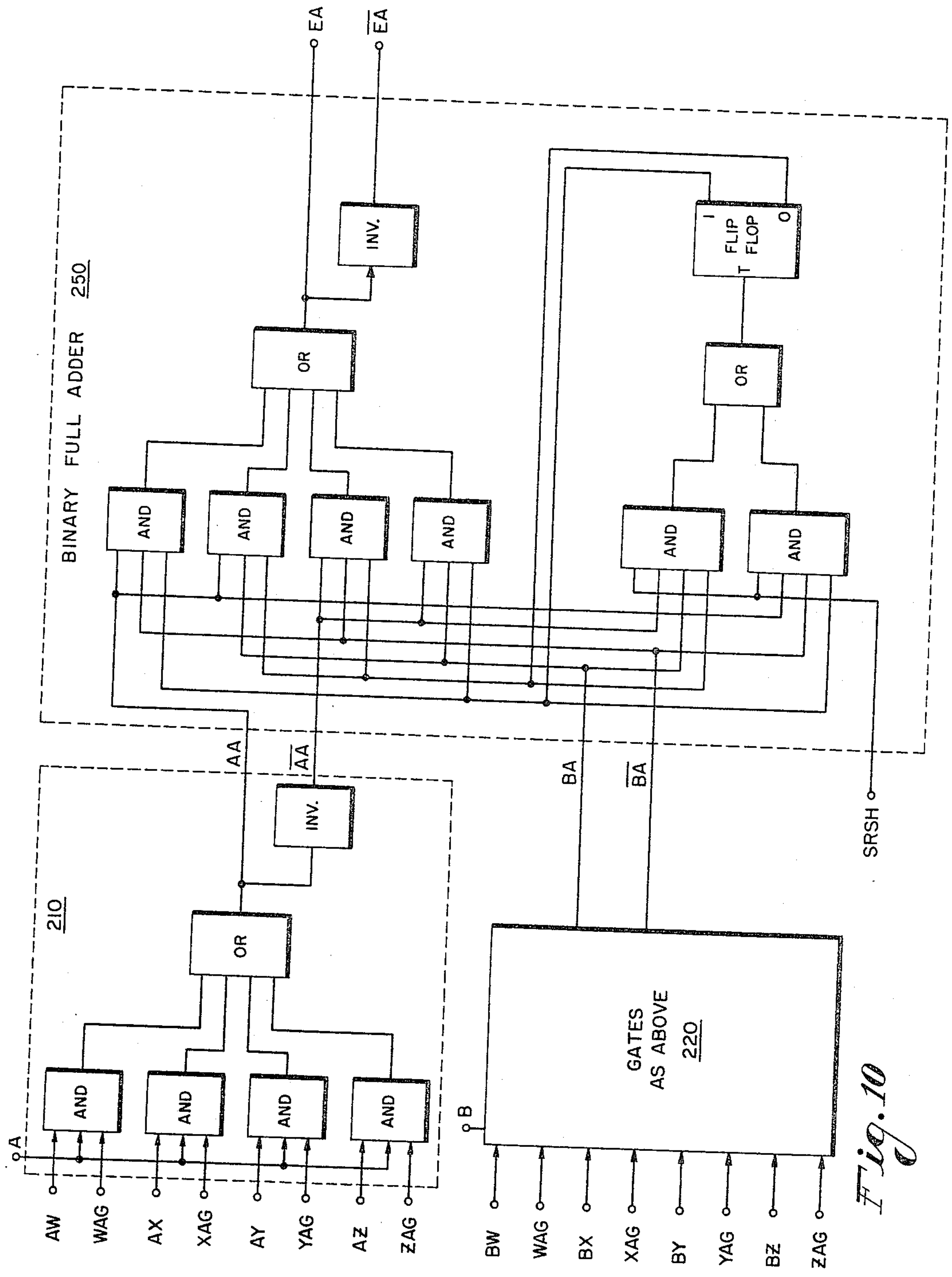
Figure 11:
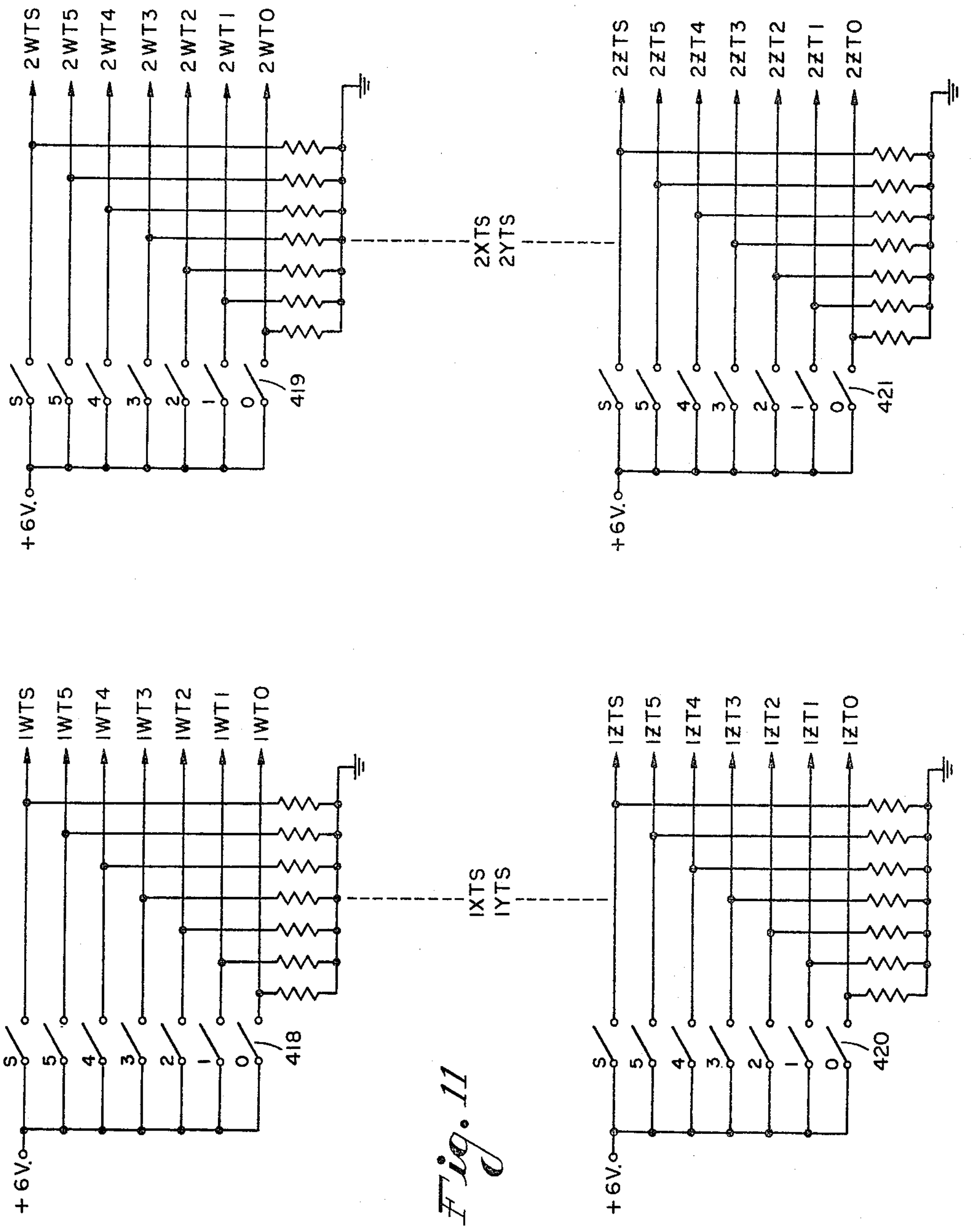
Figure 12:
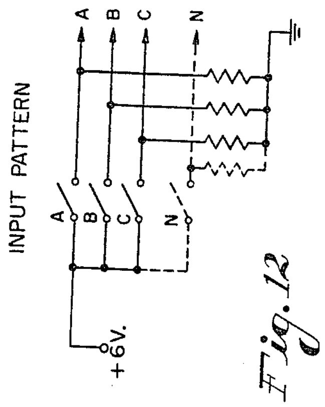
Figure 13:
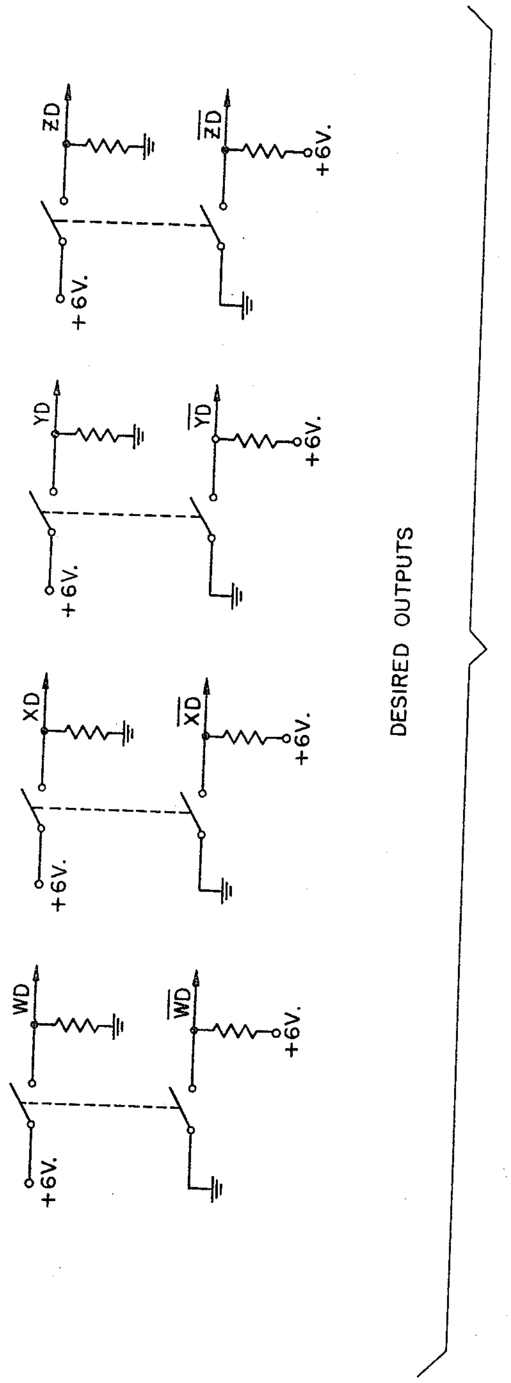
Figure 14:
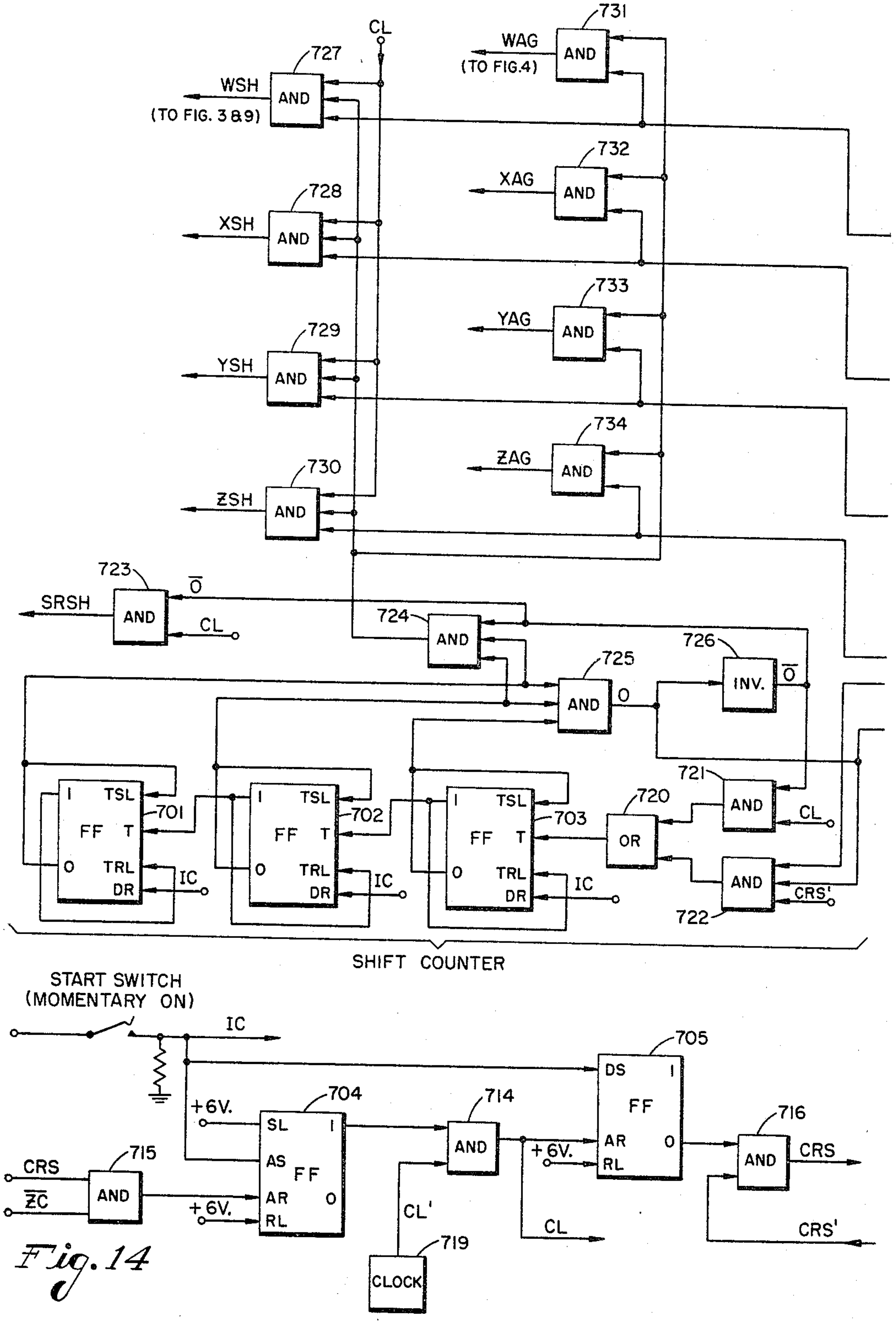
Figure 15:
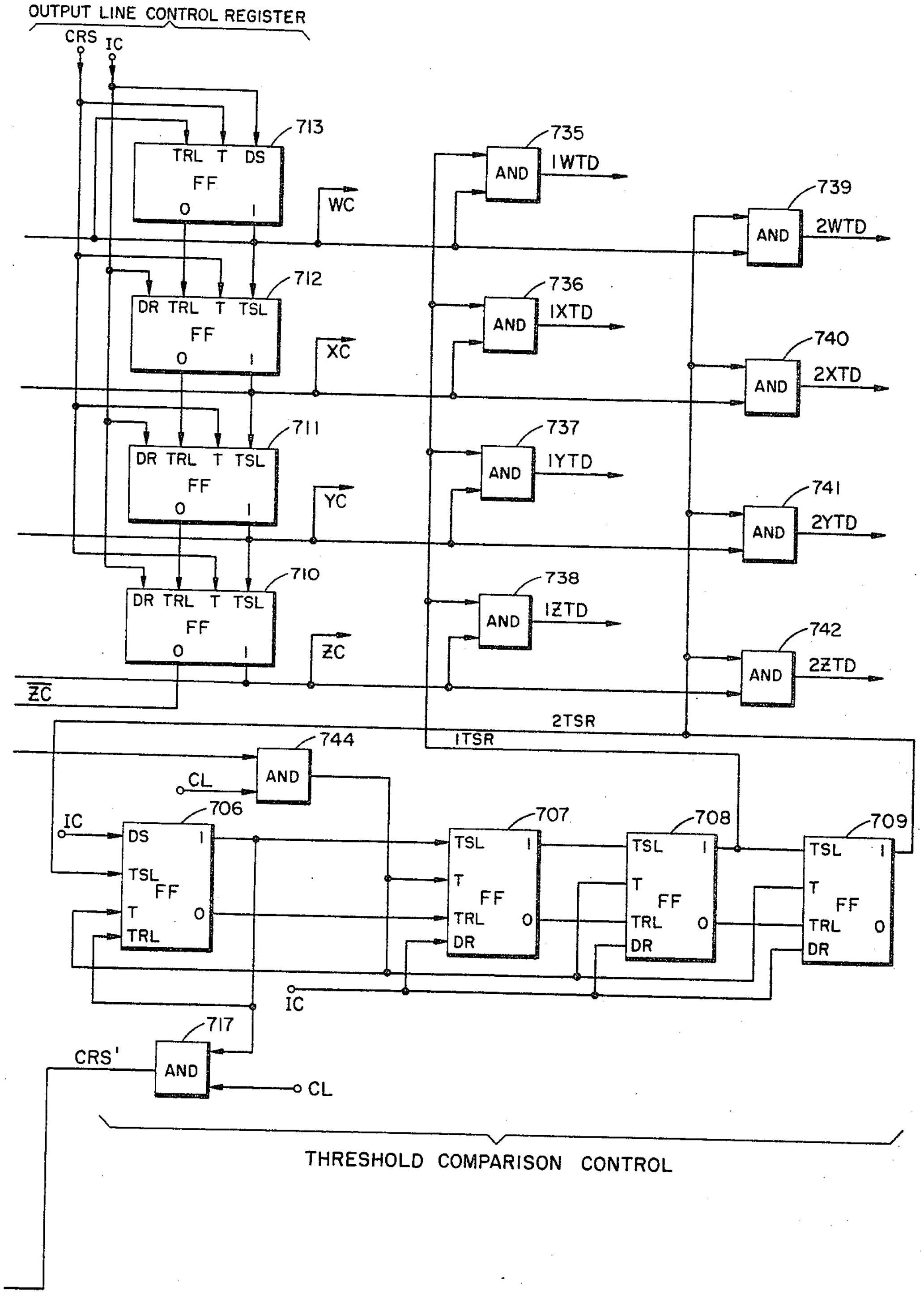
Figure 16:
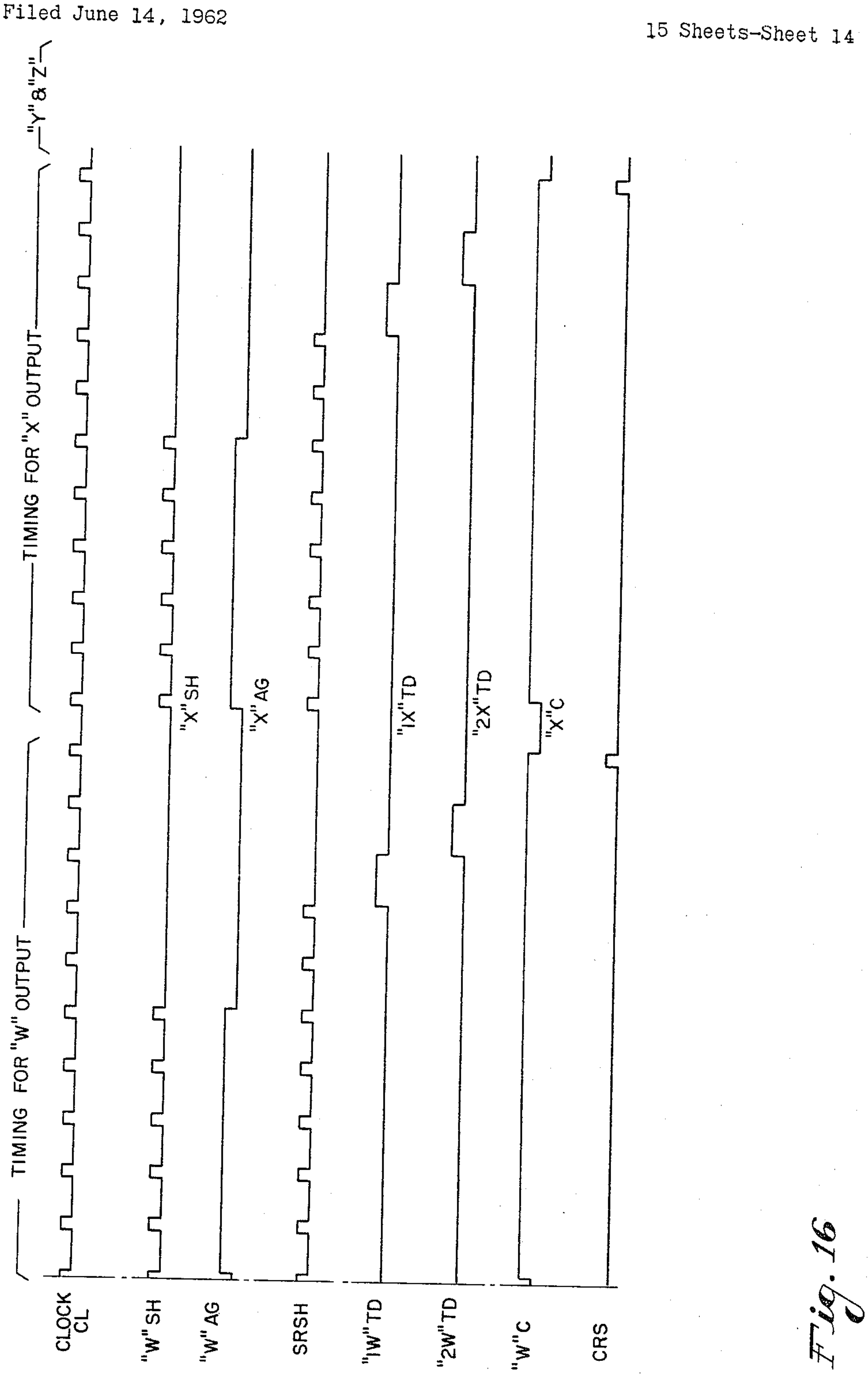
Figure 17:
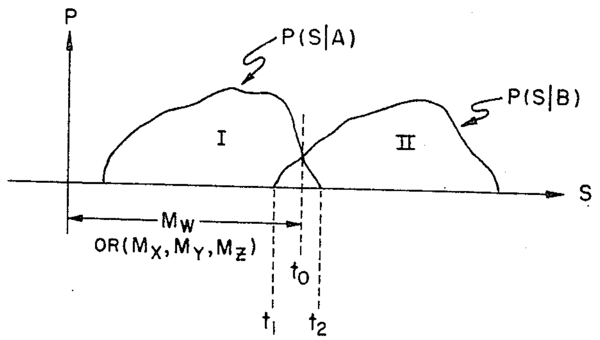
Figure 18:
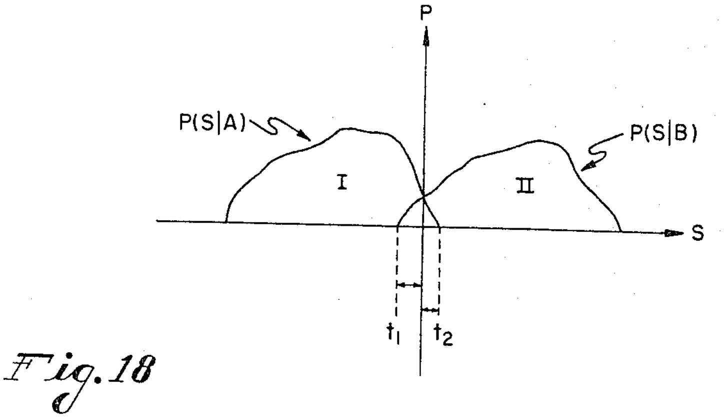
Figure 19:
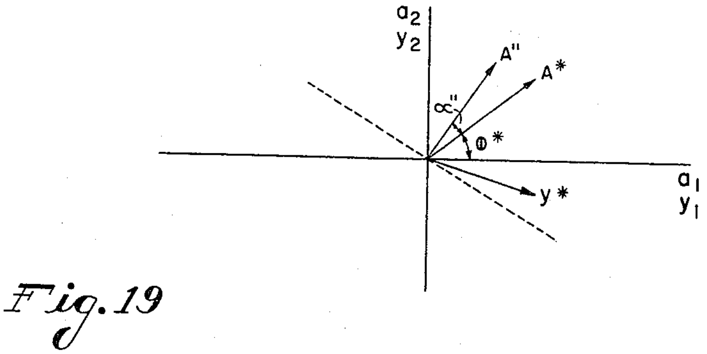

FIGS. 3, 4, 5, 6 and 7, when placed side-by-side, as shown in FIG. 8, comprise a block diagram of the principal components of one complete embodiment of this invention;

FIG. 9 is an enlarged block diagram of the principal components of one storage device employed in FIG. 3;

FIG. 10 is an enlarged block diagram of one adder and gating circuits of the type which may be used in FIG. 4;

FIG. 11 is the diagram of manually operated switch circuits for supplying coded binary thresholds to the system of FIGS. 3–7, the terminals of FIG. 11 being connected into the threshold input portion of the comparison circuits of FIG. 5;

FIG. 12 shows a switch circuit for manually simulating sensing element voltages for the system of FIGS. 3–7;

FIG. 13 is the diagram of manually operated switch circuits to supply the binary coded desired outputs to the circuits of FIG. 7 where the desired outputs are compared with the actual outputs to determine the reinforcements;

FIGS. 14 and 15, when placed side-by-side, as shown in FIG. 8, comprise a diagram of the principal components of the timing and control circuits for the system of FIGS. 3–7;

FIG. 16 is a timing diagram showing gate voltages and timing pulses for the operation of the system of FIGS. 3–7;

FIGS. 17 and 18 are curves showing the relationship of summed weights and probabilities, and the significance of two threshold values and use of a bias value, according to this invention; and FIG. 19 is a vector diagram illustrating some of the terms used in the analysis of the convergence of the adaptive network.

Figure 1:
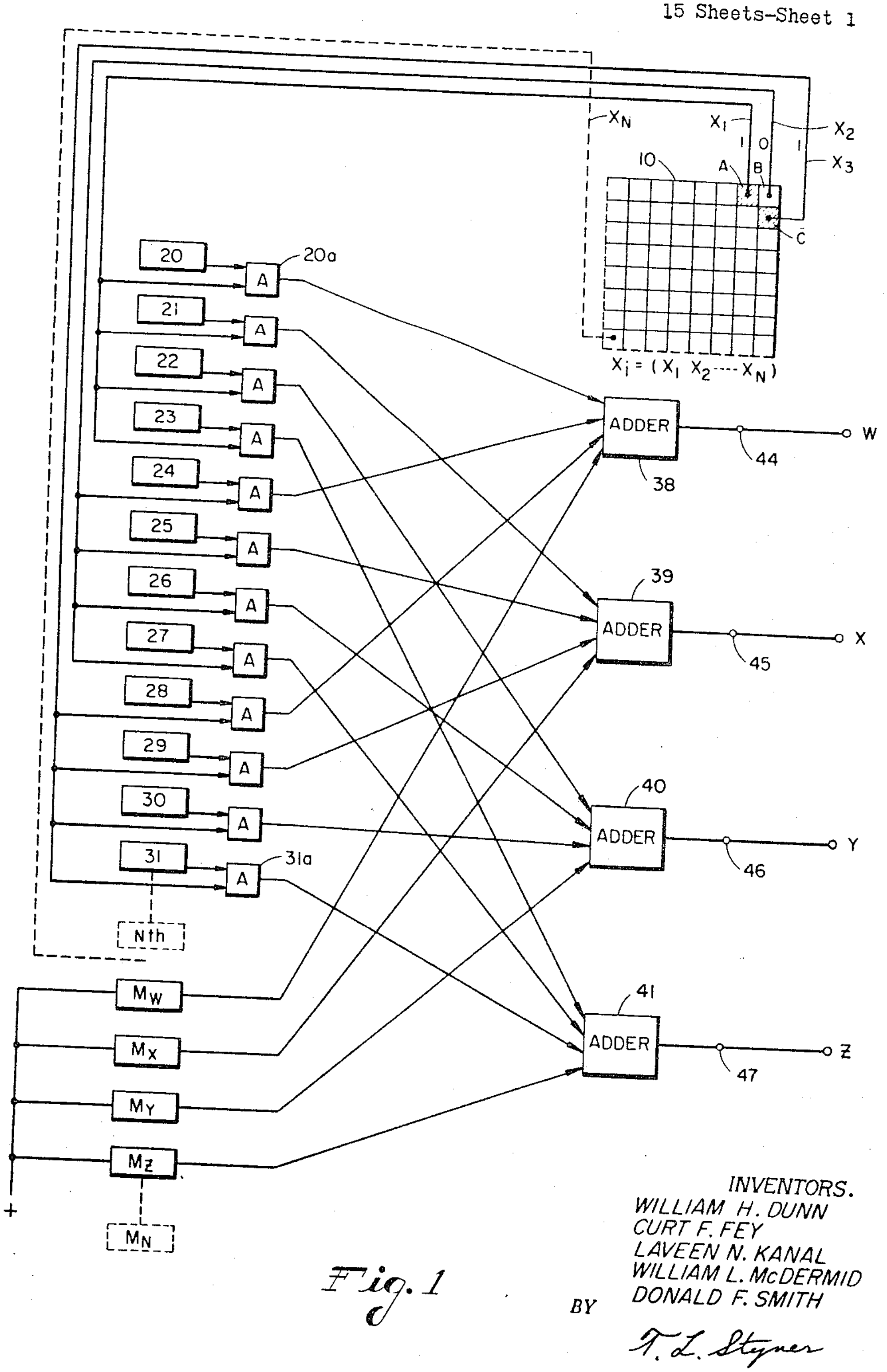
FIG. 1 is a diagram of the flow of binary information through the pattern recognition circuits of this invention.

At 10 in FIG. 1 is shown a two dimensional arrangement of sensing elements. One array useful for reading simple waveforms and alpha-numeric characters comprised 1024 elements in a 32 x 32 rectangular grid. Such a grid has reasonable resolving power and is capable of reading all of the more common typed and printed fonts of the letters of the alphabet as well as simple waveforms and geometrical figures. It will be convenient to think of each sensing element as a photocell, all of which are arranged in an optical system for recognizing black or white incremental areas of the viewed pattern. Each cell will then produce either of two voltages. These two voltages in one embodiment were +6 and 0 volts, respectively. Alternatively, the observable elementary voltages of the pattern may be obtained by two-position switch mechanisms, such as shown in FIG. 12.

For the purposes of this disclosure, three only of the sensing elements, A, B and C, are shown with sufficient circuitry to classify and read out all possible combinations, $2^3$, of black and white patterns on those three elements. The 4th to the nth sensing elements, generally, require a duplication of the circuits here illustrated. Considerable economy of circuits is effected by coding the read-out in binary numbers, the number of significant places of the binary number being sufficient to accommodate the maximum possible number of classes into which the patterns are to be grouped. In FIG. 1, the output binary number, comprising four significant places, appears on output lines W, X, Y and Z. These output lines are coupled, respectively, to the output circuits of adders 38, 39, 40 and 41, which will be referred to below. Although each output will separate the input patterns into only two classes, namely, group I and group II, four ouputs acting as a binary code will permit the input patterns to be classified into $2^4$ groups. A binary code is most efficient in the number of outputs; however, any other code using two-valued digits may be used.

Stores 20 to 31 are divided into groups, each group being controlled by one sensing element. As will appear hereinafter, the number of stores in each group corresponds, generally, to be number of coded output lines W, X, Y and Z, which is four in the example shown. In case there were ten coded output lines, for example, there would be ten stores connected to each sensing element for complete flexibility. However, after the weights in the stores have been determined, certain weights may have zero or a comparatively small numerical value. These stores may be deleted from the circuit with little or no impairment of the device as a pattern recognizer. In FIG. 1, stores 20 to 23 are controlled by sensing element A, stores 24 to 27 are controlled by sensing element B, and stores 28 to 31 are controlled by sensing element C. Control is effected, in FIG. 1, by AND gates **20*a* to 31*a***.

For detailed reasons which will presently appear, biasing stores $M_W \ldots M_N$ contain weights which importantly affect computations.

Many storage devices known in the art are suitable in the system of this invention. The stores selected should be capable of accepting and retaining numbers which can be read-in and read-out rapidly without deterioration. The sound track of a magnetic tape is capable of economical storage of binary information and is suitable. The magnetic track on a rotating drum or disc is also to be recommended because of the speed of access to the stored numbers. Alternatively, resistance networks representing proportional stored weight values, and with direct current amplifiers as adders, suffice as dynamic instrumentation in the construction of special purpose pattern recognition systems. The particular stores which will be treated hereinbelow in connection with FIG. 9 comprise a reversible counter shift register with four stages, capable of counting up to 16, and with a fifth stage for storing the plus or minus sign of the number. The numerical content of such a register may be increased or decreased by increments of 1. The contents may be serially read-out and, as will appear, can be recirculated during read-out to preserve and retain its numerical or weight count. Gate circuits are employed to controllably feed-in and read-out information of the register.

In the elementary system of FIG. 1, the basic network consisting of an adder, connected stores and controlling sensing elements, is capable of classifying each pattern into either of two groups, the proof of such classification being explained in detail in the copending application mentioned above. In FIG. 17 is plotted the summations of one adder along axis S against the probabilities, along axis P, of the patterns falling in regions I and II. Where the regions overlap, ambiguities arise and must be rejected from the output signals. According to this invention, the two classification regions I and II are shifted along the S axis by the introduction to the addition of bias values $M_W$, $M_X$, $M_Y$ or $M_Z$ for shifting the two regions to a position symmetrically about the probability axis P, as shown in FIG. 18.

Figure 2:
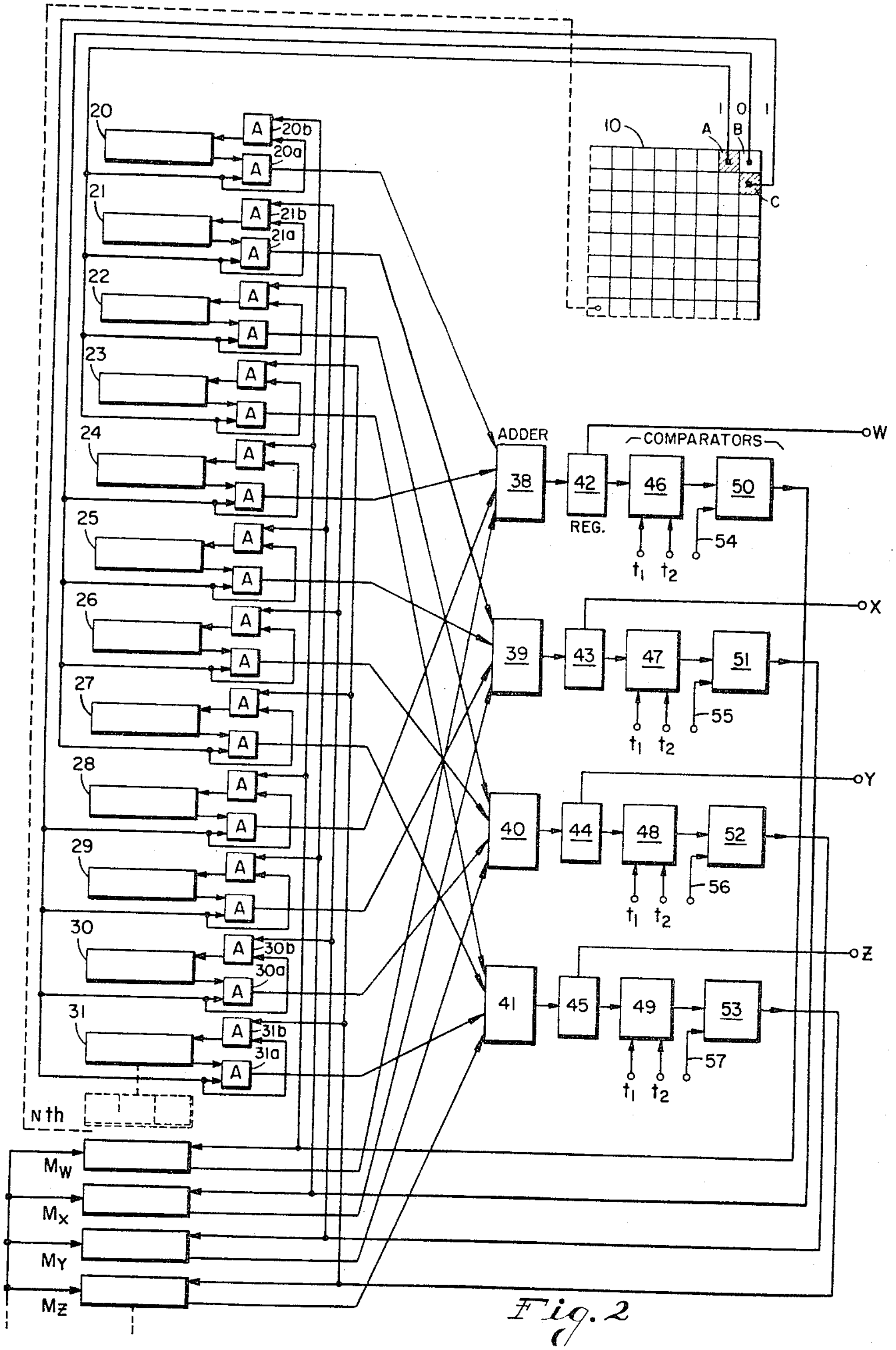
FIG. 2 is a diagram of the flow of binary information through the learning circuits of this invention.

In FIG. 2, stores 20 to 31 as well as the biasing devices $M_W \ldots M_N$ are, as stated, each capable of storing binary coded numbers. Gates **20*a* to 31*a* are connected in the read-out lines of stores 20–31, respectively, and are controlled by the sensing elements A, B, C . . . N. Gates 20*b* to 31*b* are connected to the inputs to the stores 20–31, respectively, and are also controlled by the sensing elements A, B, C . . . N. Also shown in FIG. 2 are the four output lines W, X, Y and Z for producing a binary number for each pattern presented to raster 10**. Additional output lines with additional networks may be provided to increase the capacity of the system.

Adders 38, 39, 40 and 41 handle, as stated, both positive and negative numbers. For the operations to follow, the results of the additions in the adders are preferably shifted to registers 42, 43, 44 and 45, respectively. Conveniently, the signs of the numbers in the registers are tested and read out as the logical 1 or 0 on the output lines W, X, Y, Z, a specific example of the circuits being disclosed below in connection with FIGS. 3–7. Now, to eliminate the ambiguities of the overlapping portions of the read-out numbers found between threshold values $t_1$ and $t_2$, as shown in FIG. 18, it is preferred, according to this invention, to compare in threshold comparators 46, 47, 48 and 49 the contents of registers 42, 43, 44 and 45, respectively, with threshold values $t_1$ and $t_2$.

Since the summations in adders 38–41 are shifted by biases $M_W$ . . . $M_Z$, the comparisons with the two thresholds will yield at the output of the comparators 46–49 a 1, 0 or X indicating, respectively, the output is above both thresholds, is below both thresholds, or is between both thresholds, the 1's and 0's are read out as on the W, X, Y and Z lines.

Next, the actual 1, 0, X outputs are compared in comparators 50, 51, 52 and 53 with the desired outputs which are locally generated and applied to terminals 54, 55, 56 and 57 of the comparators. When the two inputs to an actual-desired comparator are alike, that is, where they are both 1, 1 or 0, 0, no comparator output results. If, however, the output of a threshold comparator is 1 or X while the desired output is 0, reinforcement of the stores is desired and a pulse is fed back to reduce by 1 the value of the contents of each store involved in the addition. Likewise, if the output of a threshold comparator is 0 or X while the desired value is 1, reinforcement is desired and a pulse is fed back to increase the value of the contents of each involved store. It has been shown in the copending application mentioned above that iterative reinforcement of the stores, which may be termed "forced learning," will cause the weights of the several stores to converge upon a set of values which will correctly identify each of a set of patterns presented to raster 10.

As will be shown in connection with the specific embodiments shown in FIGS. 3 to 7, a single adder, a single register, a single threshold comparator and a single actual-desired comparator may be employed for performing all additions and comparing operations of the system of FIG. 2, by time-sharing techniques employing clock-operated gates.

Reference will next be made to the logic of the two thresholds $t_1$ and $t_2$.

*Two thresholds*

According to this invention, the entire region of ambiguity mentioned in connection with FIGS. 17 or 18 is eliminated from the output lines W, X, Y, Z . . . N by the introduction of two threshold values $t_1$ and $t_2$ for each line. As will be shown, the values of $t_1$ and $t_2$ are such that all summations that may produce erroneous outputs are eliminated. That is, reinforcement of the weights in the stores by +1 or −1 change, depending upon summations which are, respectively, less than $t_1$ or greater than $t_2$. It will now be proven that in a finite number, $n$, of lessons, the weights of the stores, 20 to N and $M_W$ to $M_N$, can converge to a set of values for reliably classifying each of a set of patterns and that ambiguities can be eliminated or reduced to a minimum.

It was shown in the mentioned copending application, by statistical classification theory, that for the single, or 0, threshold $$\sum_{i=0}^{i=N} a_i x_i > 0$$

and $$\sum_{i=0}^{i=N} a_i x_i < 0 \qquad (1)$$

all patterns, of $x_i$ sensing elements and $a_i$ weights, will fall in either of two classes on either side of zero. The single threshold has been moved to the left-hand side of Equations 1 as the $a_0$ term by operation of the bias weights M of FIGS. 1 and 2.

For the case of two additional thresholds, $+t$ and $-t$, which define a reject region, threshold Equations 1 become $$\left.\begin{array}{l}\sum_{i=0}^{i=N} a_i x_i > t \text{ for vectors } x \text{ belonging to class I} \\ \sum_{i=0}^{i=N} a_i x_i < -t \text{ for vectors belonging to class II}\end{array}\right\} \qquad (2)$$

Shown in FIG. 18 are two threshold values where $+t$ is shown as $t_2$ and $-t$ is shown as $t_1$ after application of the M bias values of FIG. 17. In terms of the class tagged vectors, $y=Y_0, Y_1 \ldots Y_N$, we can now write $$\sum_{i=0}^{i=N} a_i y_i > t \qquad (3)$$

or $$A \cdot Y > t \qquad (4)$$

As in the case of the single threshold, discussed in the mentioned copending application, it follows that $$\Delta B \geq \cos \theta^*$$

and $$\Delta |A|^2 = 2A \cdot Y + |Y|^2$$

where B is the projection of A on A*, the desired weight vector, and $\theta^*$ is the angle between A* and the class tagged vector farthest away from it, denoted by Y*.

But now the upper bound for A·Y is $t$ rather than 0 so that $$\Delta |A|^2 \leq 2t + (N+1)$$

and if changes are made on $n$ trials we have $$|A_n|^2 \leq A_0^2 + 2nt + n(N+1) \qquad (5)$$

However, $$B_n \geq B_0 + n \cos \theta^* \qquad (6)$$

and defining $$A'' = A - t\frac{A^*}{A^* \cdot Y} \qquad (7)$$

we get $$A'' \cdot Y = A \cdot Y - t\frac{A^* \cdot Y}{A^* \cdot Y}$$
$$= A \cdot Y - t$$

so that the condition $A \cdot Y > t$ is equivalent to the condition $$A'' \cdot Y > 0 \qquad (8)$$

Referring to FIG. 19, we now consider the case where the Y* vector farthest away from A″ still satisfies the condition $A'' \cdot Y^* > 0$. This means, if $\alpha''$ is the angle between A″ and A*, that $$\alpha'' + \theta^* < 90° \text{ or } \theta^* < 90° - \alpha''$$

so that $$\tan \theta^* < \cot \alpha''$$

Now $$\cot \alpha''=\frac{A''\cdot A^*}{|A^*|}\Big/\sqrt{|A''|^2-\left(\frac{A''\cdot A^*}{|A^*|}\right)^2}$$

or $$\cot \alpha''=\frac{\frac{A\cdot A^*}{|A^*|}-t\cdot\frac{A^*\cdot A^*}{|A^*|(A^*\cdot Y^*)}}{\sqrt{\left|A-\frac{tA^*}{A^*\cdot Y^*}\right|^2-\left\{\frac{A\cdot A^*}{|A^*|}-t\cdot\frac{A^*\cdot A^*}{|A^*|(A^*\cdot Y^*)}\right\}^2}}$$

or $$\cot \alpha''=\frac{B-t/|Y^*|\cos\theta^*}{\sqrt{|A|^2-B^2}} \quad (9)$$

Therefore $$\tan\theta^*<\frac{B-\frac{t\sec\theta^*}{|Y^*|}}{\sqrt{|A|^2-B^2}} \quad (10)$$

Squaring gives the equation, $$B^2-\{|A|^2-B^2\}\tan^2\theta^*-\frac{2Bt}{|Y^*|}\sec\theta^*+\frac{t^2\sec^2\theta}{|Y^*|^2}>0$$

which can be reduced to $$B^2\sec^2\theta^*-\frac{2Bt\cdot\sec\theta^*}{|Y^*|}+\frac{t^2\sec^2\theta^*}{|Y^*|^2}-|A|^2\tan^2\theta^*>0 \quad (11)$$

which is analogous to the expression for the single threshold case. Substituting for B from Equation 6 and for A from Equation 5 gives the following $$(B_0+n\cos\theta^*)^2\sec^2\theta^*-2(B_0+n\cos\theta^*)\frac{t}{|Y^*|}\sec\theta^*+\frac{t^2\sec^2\theta^*}{|Y^*|^2}-\{|A_0|^2+2nt+n(N+1)\}\tan^2\theta^*>0$$

or $$n^2+n\left\{2B_0\sec\theta^*-\frac{2t}{|Y^*|}-2t\tan^2\theta^*-(N+1)\tan^2\theta^*\right\}+\left(B_0^2\sec^2\theta^*+\frac{t^2\sec^2\theta^*}{|Y^*|^2}-2B_0\frac{t}{|Y^*|}\sec\theta^*-|A_0|^2\tan^2\theta^*\right)>0 \quad (12)$$

Consider the case $A_0=0$ and $B_0=0$. Then the root of the equation of interest is given by:

$$n>\frac{(N+1)}{2}\tan^2\theta^*+t\tan^2\theta^*+\frac{t}{|Y^*|}+\sqrt{\left[\frac{(N+1)^2}{4}\tan^4\theta^*\left\{1+\frac{4t\cot\theta^*}{|Y^*|(N+1)}+\frac{4t}{(N+1)}\right\}+t^2\tan^4\theta^*\left\{1+\frac{2\cot^2\theta^*}{|Y^*|}-\frac{\cot^2\theta^*}{|Y^*|^2}\right\}\right]} \quad (13)$$

From (13) we note that for $t=0$ we get $$n>(N+1)\tan^2\theta^*$$

which is the same as when zero threshold is solved for. Equation 13 has additional terms depending on the threshold $t$ and the upper bound for $n$ obtained for this case is greater than that found in the 0-threshold case. For the two threshold cases, the iterative teaching procedure will converge to the desired vector A*, although it may require a greater number of lessons.

The above two derivations show that when a solution exists the iteration procedure will converge in a finite number of trials and the upper bounds for the single threshold and two-threshold cases can be computed. When a solution does not exist, that is, when the two classes are not completely separable by a linear classification function, the above iteration procedure can be used in conjunction with a stopping rule such that after a given number of trials have shown that a solution is unlikely, trials may be continued until the total error of misclassification for the two groups is at a minimum.

*System of FIGS. 3–7*

To implement the pattern recognition system of two thresholds treated above, the system of FIGS. 3–7 has been laid out. It would be impractical and unnecessary to show more in these figures than one example of each of the important operating blocks of the system. In FIGS. 3–7, only three sensing elements A, B and C are again considered, although up to 1024 elements are contemplated in the 32 x 32 array, and four output lines W, X, Y and Z are shown. Lines connecting boxes and terminals of these figures are, generally, identified by various combinations of letters A, B, C and W, X, Y and Z to suggest the particular source and destination of signals in the lines. Data flows from left to right from FIG. 3 to FIG. 7. For recognition functions only, without "learning" attachments, the data flows from FIG. 3 to FIG. 6 where the output lines W, X, Y and Z are shown. However, when the machine is to have learning capabilities to recognize a set of patterns and reinforcement of stores 20 to 31 and $M_W$, $M_X$, $M_Y$, $M_Z$ are required, feedback lines from FIG. 7 to the stores in FIG. 3 are employed. The feedback lines are labeled AWN and AWP, for example, for feeding back negative and positive information, respectively, to stores controlled by the sensing element A and contributing to the output W.

Stores 20, 21, 22 and 23 can be read or scanned and their contents admitted through gate 210 to binary adder 250. Stores 24, 25, 26 and 27 are connected through gate 220 to adder 250, and stores 28, 29, 30 and 31 are connected through gate 230 to adder 260. Bias stores $M_W$, $M_X$, $M_Y$, $M_Z$ are gated through gate 240 to adder 260. Adders 250 and 260 are full adders and their output sums are combined in full adder 270. Adders 250, 260 and 270 are employed in the whiffle-tree configuration in the interest of speed of circuits. Gates 210, 220 and 230 are controlled, respectively, by sensing elements A, B and C and, in the example shown, to permit contribution of the stored weights to the adders only when the sensing element is active or produces a logical voltage of 1. If the logical voltage is 0, the gates disable the associated stores. Further, the gates are controlled by successive timing pulses WAG, XAG, YAG and ZAG from the timing circuits of FIG. 14 to control the orderly introduction of the weights to the adders. The gates are shown in greater detail in FIG. 10. At the ouput of adder 270 appears the summation signals KA and their complements $\overline{KA}$.

The summation number comprises, in the example here considered, six significant binary places and a sign, the bits of which move step-by-step into the shift register 42 of FIG. 5. The shift register 42 comprises flip-flops 401, 402, 403, 404, 405, 406 and 407 which contains, respectively, the sign, the 5th, the 4th, the 3rd, the 2nd, the 1st and the 0 signficant bit of the binary number received from the adder. The contents of the register 42 is then compared bit-by-bit in threshold comparator 60 with two different seven-place threshold numbers supplied from lines TS, T5, T4, T3, T2, T1 and T0. Before proceeding with the comparison operations in comparator 60, reference will be made to the sources of threshold numbers.

*Threshold sources*

In FIG. 11 is shown a set of switches 418 labeled, respectively, S, 5, 4, 3, 2, 1, and 0, each of which can be operated to produce seven bits of the first binary threshold number for the W output, namely, 1WTS, 1WT5 . . . 1WT0. These output terminals are connected, respectively, into the threshold gate networks 422, 423, 424, 425, 426, 427 and 428 of FIG. 5. The second threshold binary number for the W output is generated in the set of switches at 419 to produce seven logical 1's or 0's at terminals 2WTS, 2WT5 . . . 2WT0 which likewise are connected, respectively, into the threshold networks 422 to 428. Sets of switches 420 and 421 generate, respectively, the first and second binary threshold numbers for the Z outputs. Similar sets of switches, not shown, are provided for the X and Y outputs. In FIG. 5, the first and second sets of bits TS, T5 . . . T0 are gated into networks 422 to 428 by the first and second timing pulses, TD. Timing pulse 1WTD, for example, is employed to admit the 1WTS . . . 1WT0 threshold binary number to the comparator 60, and timing pulse 2WTD admits the 2WTS . . . TWT0 threshold binary numbers to the comparator 60. The first and second threshold binary numbers for the next output, X, are likewise successively admitted to the comparator 60 by the 1XTD and 2XTD timing pulses. Then, the first and second TD timing pulses are repeated for the Y output and finally for the Z output.

As will appear, the sum standing in register 42 is compared with the two threshold numbers to determine if the sum is greater than, less than or intermediate the thresholds. The three possibilities are evidenced by a "1" signal, respectively, on terminals W, $\overline{W}$ or $\overline{W}$ of FIG. 6. It will appear, also, that the logic of the AND gates and flip-flops of FIG. 6, in combination with the comparing circuits of FIG. 5, will produce these three possible signals for each of the W, X, Y and Z outputs.

The circuitry of FIG. 7 is employed only during the "learning" procedures. That is, if the set of weights in stores 20 to 31 and M have not been computed and set into the stores for a given set of patterns, the system of this invention can, by reinforcement voltages to the stores, change the weights *n* numbers of times until the optimum set of stores has been arrived at. To teach the system a new set of patterns, a desired binary coded number WD, XD, YD and ZD must be assigned for each pattern on raster 10. The desired binary outputs $\overline{WD}$ . . . $\overline{ZD}$ and their complements $\overline{WD}$ . . . $\overline{ZD}$ may be generated if desired by the simple switch mechanisms of FIG. 13. When the desired signals WD . . . ZD are combined with the actual outputs W . . . Z in the logic circuitry of FIG. 7, positive or negative reinforcement pulses are generated and fed back to the stores in FIG. 3. For example, AWN, BWN and CWN negatively reinforce the stores associated with the A, B and C sensing elements which contribute to the W output. MWN negatively reinforces the weight of the biasing store $M_W$. Conversely, AWP . . . MWP positively reinforce the stores in FIG. 3.

The operation of the system in FIGS. 3–7 will now be recapitulated in connection with the timing circuits of FIGS. 14 and 15 and the timing diagrams of FIG. 16. It is to be remembered that a set of outputs W, X, Y and Z are to be generated by a pattern A, B, C . . . N on the input raster. As stated, the data flow is from FIGS. 3 to 6 for recognition purposes only; and, if learning is desired, reinforcement is required which requires that outputs computed in FIG. 7 be fed back to the stores in FIG. 3.

The timing sequence of FIG. 16 shows the sequence for the minor cycles for producing the W output. The minor cycle is repeated for the X, the Y, and the Z outputs. A major cycle, in this embodiment of four outputs, consists of four minor cycles, all being identical. That is, the WSH set of five clock pulses in FIG. 16 is repeated by a set of five clock pulses XSH and a set of five clock pulses YSH and a set of five clock pulses ZSH for successively producing W, X, Y and Z.

Consider first the events important in the W output major cycle. Weight counts stored in stores 20, 24, 28 are shifted out of the stores under the control of sensing elements of raster 10 by way of gating circuits 210, 220 and 230 to adders 250, 260 and 270. Also, $M_W$ is gated through 240 to adders 260 and 270. The result of the first addition is a seven-place binary number which is moved into shift register 42. This result is then compared in comparator 60 against the first threshold value 1WTS . . . 1WT0 and then with the second threshold 2WTS . . . 2WT0, each of which is successively gated into the threshold networks 422–428 of FIG. 5. During the first minor cycle, the $\overline{W}$ line, FIG. 7, goes on if the threshold comparison shows that the sum in register 42 lies in the reject region between the two thresholds. The W output line goes on if the sum is greater than 0, and the $\overline{W}$ output line remains off if the sum is less than 0. The $\overline{W}$ signal is always the complement of W. The same comments can be made for the X output, the Y output, and the Z output.

In considering the details of operation of a minor cycle, it can be seen how the shift pulses produced in FIGS. 14 and 15 from the clock pulse CL operate in FIGS. 3–7 and in FIGS. 9 and 10. To determine the output W, the weight values in store registers 20, 24, 28 and $M_W$ are shifted serially by shift pulses WSH. The bits of the weight count are shifted through gates 210, 220, 230 and 240 to adders 250 and 260. During the time these bits are being shifted, control line WAG is "on," allowing only those weights which will contribute to the W output to pass through the adder AND gates 210–230, best shown in FIG. 10. Also, as previously stated, a weight is not to be added unless it is associated with an active sensing element. The sensing element A controls the flow of bits through gate 210, while the sensing element B controls the flow of bits through gate 220, and sensing element C controls the flow of bits through gate 230. In the operating example above assumed, sensing element B is inactive and hence inhibits gate 220. It is to be noted that the store 20 is of the shift register type and contains five stages for four bits and a sign and that there is provided a total of five WSH pulses, with the WAG gate open only during the five WSH pulses.

In this implementation, with five-bit inputs to the full adders, a maximum of six bits and a sign bit will be required, due to carry. Hence, seven shift pulses SRSH are provided to pass the total sum into register 42.

The next step in the sequence is to determine whether the sum is greater than 0. Control line 1WTD becomes active after register 42 is filled (see FIG. 16) and allows flip-flop 501 of FIG. 6 to sense on line 42*a* the sign bit S in flip-flop 401 of register 42. If in flip-flop 401 the sign bit is a 1, flip-flop 501, FIG. 6, will set to its "1" state and the directly connected read-out line, W, will contain a logical 1. If the sign bit in flip-flop 401 is 0, flip-flop 501 is not set and output line W will contain a logical 0.

Also during the time 1WTD is active, the first or higher threshold associated with the output W is gated on to comparison circuit 60 through the AND gating circuits 422–428 of FIG. 5. If the sum in register 42 is less than or equal to the higher threshold, comparator 60 with OR gate 420 causes line TH to become active.

The comparator circuit 60 operates as follows. The only condition which will made line TH active is that the inputs to OR gate 420 be all logical 0. The comparison proceeds from the sign bit S and TS to 5 and T5 and hence on toward the least significant bits 0 and T0. If S is a 1 and TS is a 0, the output of AND gate 408 is a logical 1 which will hold TH at logical 0 regardless of other inputs to 420. If S is a 0 and TS is a 1, the output of AND gate 408 is a 0 and the output of OR gate 408*a* is a 0 which inhibits all following AND gates 409, 410, 411, 412, 413 and 414, thus assuring all 0 inputs to 420. If S and TS are equal, that is, if both are 0 or both are 1, the output of AND gate 408 is 0 and the output of 408*a* is a 1 which allows comparison at the 5 and T5 level. Gates 409 and 409*a* will then determine TH or allow comparison at the next lower level.

Figure 6:
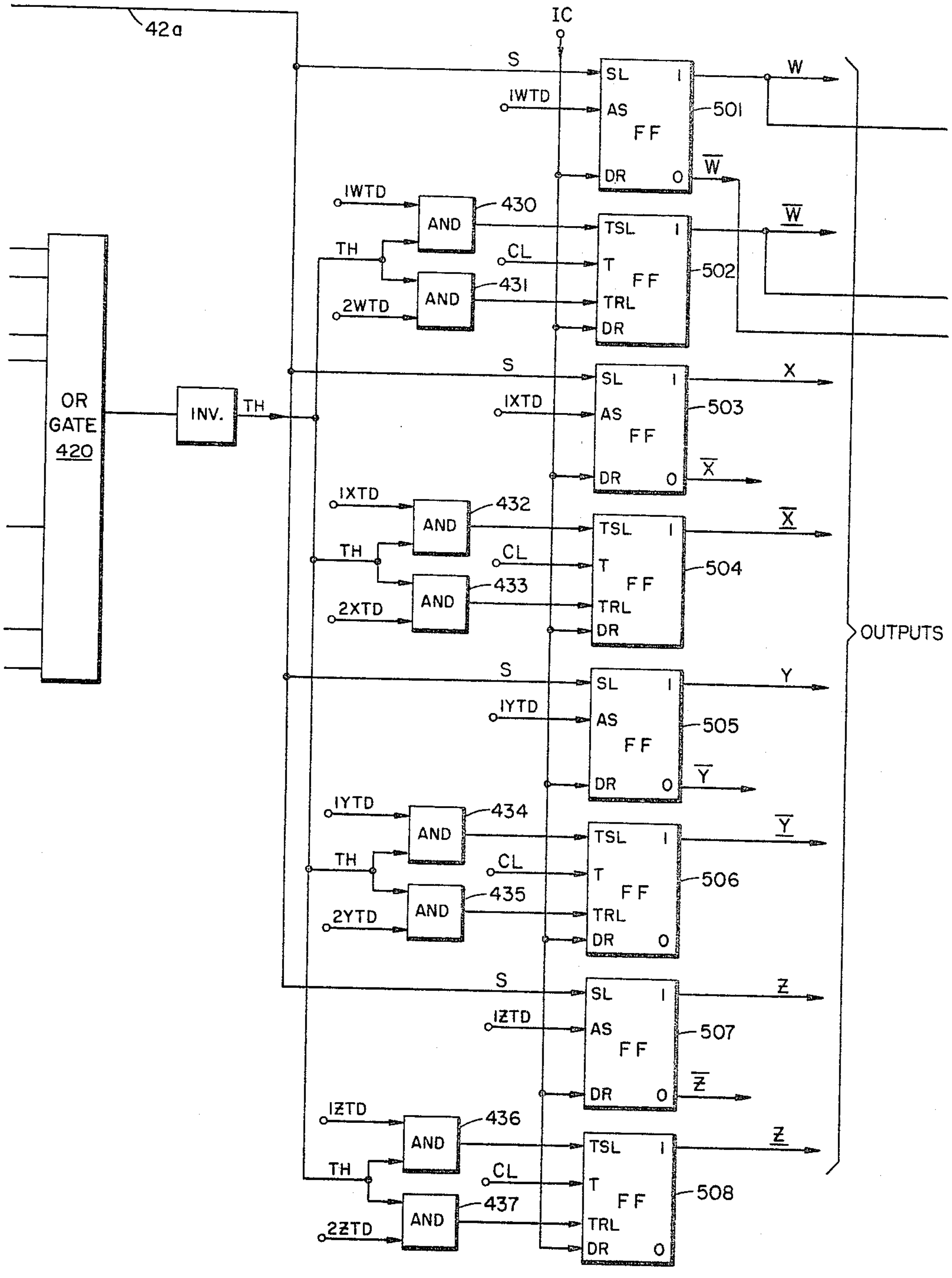

The TH signal is gated through AND gate 430, FIG. 6, by the 1WTD timing signal to set flip-flop 502. The 1WTD timing signal now becomes inactive and the 2WTD timing signal becomes active to allow comparison of the sum in register 42 with the second or lower threshold. If the sum is less than the lower threshold, line TH again becomes active and is gated through AND gate 431 by the 2WTD timing signal to reset flip-flop 502. If the sum is larger than the lower threshold, line TH remains off, leaving flip-flop 502 set to indicate that the sum is lower than the first threshold and higher than the second threshold. In this manner, flip-flop 502 is on only if the sum lies between the two thresholds and the $\overline{W}$ is employed to indicate a rejected signal.

At this point, output line W is "on" or "off" indicating whether the sum in register 42 is greater than 0, or is equal to or less than 0. Also, line $\overline{W}$ is "on" or "off" according to whether or not the sum lies between the two thresholds associated with the W output.

The next step in the minor cycle involves the reinforcement pulses determined by the networks of FIG. 7. If the actual ouptut W on flip-flop 501 is a "1" or if $\overline{W}$ is "on" while the desired output WD is 0, reinforcement is necessary and pulses are fed back to reduce the weight value of the appropriate stores. As stated, all desired outputs, WD, XD, YD, ZD, may be locally generated, as in the switch sets of FIG. 13.

Output W or $\overline{W}$ will go through OR gate 650 and be allowed to pass through AND gate 652 since desired output $\overline{WD}$ is "on." The timing pulse CRS shown on the timing diagram of FIG. 16 will pass through AND gate 654, since line WC is active, to AND gates 660, 661, 662 and 663. Where sensing elements A and C are "on," as in the above assumed operating example, the A and C signals operate only AND gates 660 and 662. The resulting AWN and CWN signals are fed back to the stores 20, 28 and $M_W$ to decrease the weight contents of those registers. Observe again that stores 20 and 28 are in those groups of stores which were enabled by the sensing elements A and C.

If, on the other hand, the actual W output is 0 or there is a reject $\overline{W}$ while the desired output WD is 1, positive reinforcement is desired and a pulse is fed back which increases the value of the appropriate weight count. In this case, either $\overline{W}$ or $\overline{W}$ passes through OR gate 651, FIG. 7, and is allowed to pass through AND gate 653 by the desired output WD which is active to gates 664 through 667. Where only sensing elements A and C are active, gates 664 and 666 pass pulses AWP, CWP, MWP to increase the weight count in registers 20, 28 and $M_W$. Additions in FIG. 4, comparisons in FIG. 5, read-out in FIG. 6, and reinforcement in FIG. 7 repeat for the X output and then for the Y output and finally for the Z output, to complete the four minor cycles and one major cycle. It may be found desirable on occasion to manually stop reinforcement operations. Reinforcement would be stopped when the device has "learned" the patterns, or when one wishes to check the error rate without the output being modified during checking by reinforcement. A switch connected to the CRS terminal of gate 654 can serve to inhibit this operation.

*Logic modules*

Four types of logic modules, namely, AND gates, OR gates, inverters and flip-flops, are used through the system here disclosed. Their circuitry is of standard design known in the art. The AND gates and OR gates perform the logical AND and OR functions with +6 volts and ground level as the logical 1 and 0, respectively. The inputs to the various flip-flops perform functions as follows. A logic 1 on the DS input will set the flip-flop so that the 1 output is at +6 volts, while a logic 1 on the DR input will reset the flip-flop so that the 0 output is at +6 volts. A negative change in voltage, such as the trailing edge of clock pulses, at the AS input will set the flip-flop when +6 volts is on the SL input, while a negative change in voltage at the AR input will reset the flip-flop when +6 volts is on the RL input. A logical 1 on the TSL input will set the flip-flop when the falling edge of the pulse is applied at the T input, while a logical 1 on the TRL input will reset the flip-flop when the falling edge of a pulse is applied at the T input.

*Store details*

While the stores 20 to 31 and $M_W$ to $M_N$ may be of many types, one particular store is shown here in some detail. In FIG. 9, store 20 comprises a five-stage shift register including flip-flops FF1, FF2, FF3, FF4 and FF5. The binary number contained in these five stages are serially read out at terminal AW as the clock pulse WSH pulses the stages. At the same time, the output AW feeds back into the input of FF5 so that at the conclusion of the read-out the original binary number stands in the store.

The weight content of the shift register may be manually fed-in by the set of two-position switches 200 shown in FIG. 3. The binary bits of a five-place binary number are composed upon the five switches and are fed into the five stages of the stores. Each store may be manually weighted by connecting the switches successively to the stores through the gang switches MS, M3, M2, M1 and M0.

To increase the store weight during reinforcement procedures, an AWP signal, FIG. 9, fed back from FIG. 7, passes through OR gate 204 and changes the state of flip-flop FF1. The AWP is compared in gate 212 with the state of the flip-flop FF1 to determine whether or not the next higher flip-flop should be changed. This process is repeated throughout the stages until an increase of 1 in the store is effected. Similarly, if the store weight is to be decreased, an AWN signal is fed through OR gate 204 to change the state of flip-flop FF1. The AWN signal is compared with the state of FF1 in gate 213. Thus, after an AWN or an AWP feedback signal, the numerical weight of the contents of the store is either decreased or increased by 1.

As suggested, the stores may assume many known type of circuits and, in the interest of economy of circuits, the stored information can be "written" into segments on the track of a magnetic disc or drum with suitable address and read-in and read-out circuitry. Alternatively, the stored weights may be contained in a set of proportional resistors, connected as a Kirchoff adder, the conductance of the resistors representing proportional weight information.

It will be seen now that the pattern recognition and learning systems above specifically described attain the objects of this invention. In this system, a set of stores in a given pattern recognition system are added in full adders and the sums are compared with two thresholds to obviate ambiguities caused by overlap of the probability curves of the patterns. A different set of stores contribute to each addition, the additions all being performed in one set of full adders and the succession of additions being effected by successively operating gates coupled between the stores and the adders. The succession of additions contribute successively to the outputs W, X, Y, Z . . . N. If there is ambiguity in any one of the additions, a reject signal $\overline{W}$, $\overline{X}$ . . . $\overline{N}$ appears at the output of the system.

During the learning mode of operation, a reject signal or a mismatch of the actual and desired bit of the output binary number results appropriately in a positive or negative reinforcement of the stores contributing to the actual output bit.

From the principles described above, persons skilled in this art may make many modifications in the details of the system without departing from the invention as described or as defined in the appended claims.

What is claimed is:

1. A pattern recognition system comprising a plurality of sensing elements for observing the elements of a pattern, a plurality of groups of weight stores, an adder, means for successively gating the weight contents of the stores of the groups of stores to said adder, a register for receiving the summation quantity of each addition, a first and second threshold number generator, a comparator, means for coupling said comparator to said register and to said threshold generators for successively comparing the contents of said register with a first and second threshold number, a plurality of output lines, means for coupling said lines successively to said register for reading out a logical 1 or 0 depending, respectively, on whether the contents of said register is greater than 0 for producing on said output lines a binary output number to identify each pattern, and logical circuit means coupled to said comparator for indicating when the numerical content of said register is intermediate the numerical content of said first and second threshold number.

2. A pattern recognition system comprising a plurality of output lines, a plurality of sensing elements for sensing the elemental parts of said patterns, a plurality of sets of stores containing sets of variable numerical weights, biasing store means containing, respectively, fixed numerical weights, means for separately summing a different set of said variable weights, and means for biasing each summation with one of said fixed weights so that the summation will yield a logical 0 or 1, and means for applying each summation result to a different one of said lines.

3. In a recognition system for patterns, an output circuit for containing a binary number for each pattern, sensing elements for observing each pattern, each sensing element producing either of two voltages, a plurality of stores containing sets of numerical weights, means for successively summing different sets of said stores, means for normalizing each summation product, means for storing each summation, generators for generating sets of two threshold quantities, means for comparing each summation product with two of said threshold quantities, and means for applying a logical 1 or 0 to said output circuit in response, respectively, to summations greater than or less than said two threshold quantities, and means for reporting out a distinct reject signal when said summation product is intermediate said two threshold quantities.

4. The pattern recognition system defined in claim 3 further comprising means for reinforcing the weights of said stores in response to said reject signals.

5. A pattern recognition system comprising a plurality of sensing elements, a plurality of stores, an adder for summing certain of said stores in response to activity of certain of said sensing elements, a register for storing each summation, a plurality of threshold sources of two values, a comparator for comparing the contents of said register with each of two threshold values, means for reporting out as one significant place of a binary number each summation which is greater than or less than said two values, means for reporting out a distinct signal when said register summation lies between said two threshold numbers, means for comparing the actual reported binary members with desired binary numbers, and means for reinforcing said stored weights when said actual and desired binary numbers differ.

6. A pattern recognition system comprising an array of sensing elements, a plurality of sets of weight stores for storing weights of either sign, a plurality of bias stores for storing weights of either sign, a full adder, a source of timing pulses, a series of gates, said gates being responsive, respectively, to said sensing elements and being responsive, respectively, to successive timing pulses for gating the contents of different weight stores to said adder to produce a summation number, a gate responsive to said timing pulses for successively gating the contents of said bias stores to said adder, a register for receiving said summation number from said adder, said register including means for indicating the sign of said summation number, a plurality of output lines, and means responsive to said source of timing pulses for successively coupling said output lines to said sign indicating means.

7. A pattern recognition system comprising a plurality of sets of weight stores, a plurality of bias stores corresponding in number to the number of said sets of weight stores, a plurality of sensing elements, adder means, means responsive to said sensing elements for admitting the contents of one weight store of each set of weight stores to said adder means to produce a summation number, means for admitting one of said bias stores to said adder means for each addition, a register for storing said summation number, said register containing means for indicating the sign of the summation number, a plurality of output lines, first and second threshold number sources which provide first and second threshold numbers, a comparator, said comparator being responsive to said register and to said threshold sources, means for determining when the number stored in said register is of a value intermediate a said first and a said second threshold number, and means for generating a characteristic signal when said number stored in said register is of said intermediate value.

8. A read-out system for a pattern recognition device which produces summation numbers in response to the weighted values of elements of the pattern for classifying each of a plurality of patterns, said system comprising a register, means for successively feeding a series of said summation numbers with signs representing digits to said register, an output circuit responsive to said sign representing digits in said register for producing a register number having a series of binary bits coded to indicate said patterns; and means for generating a reject signal for each bit position of said register number including a comparator, a generator of a first series of threshold numbers, a generator of a second series of threshold numbers, a set of flip-flops, means for successively setting the flip-flops when said threshold numbers in said first series are higher than said register numbers, and means for resetting the set of flip-flops when said threshold numbers in said second series are lower than the register numbers.

9. A pattern recognition system comprising a register in which numbers are stored corresponding to the pattern under observation, a plurality of threshold number generators, a comparator with logical circuitry for successively comparing bit-by-bit the number stored in said register with each of two threshold numbers, a gate connected to the output of said comparator for delivering a signal when the number stored in said register is different from the threshold number, and a series of bistable devices coupled to said gate and adapted to be successively set and reset by said gate.

10. A pattern recognition system comprising a plurality of sets of weight stores, a plurality of bias stores, said stores containing numbers of positive or negative signs, adder means for successively combining one weight from each of said sets of weight stores and one of said bias stores to generate a series of numbers of one or the other sign, means for generating a logical 1 or 0 for each sign, means for successively comparing the generated 1's or 0's with desired 1's and 0's, and means for feeding back to said weight stores and to said bias stores information for changing the weight contents of said stores when the compared 1's and 0's are dissimilar.

11. A pattern recognition system comprising a plurality of stores containing weights of either sign, means for combining the weight contents of certain of said stores, a register for holding the combined weights as a multiple-place binary number with a sign, an output circuit, means responsive to the sign of each number for delivering a logical 1 or 0 successively to said output circuit, means for locally generating threshold numbers, a comparator for comparing successively each register number with two of said threshold numbers, a flip-flop responsive to said comparator, means for setting said flip-flop in response to one threshold-to-number comparison, and means for resetting said flip-flop in response to the second threshold-to-number comparison, means for generating a feedback signal in response to said flip-flop, and means for adding said feedback signal to the weight contents of said certain stores.

12. A system for classifying a plurality of patterns, comprising (a) a plurality of sets of storage means, each providing storage for a numerical weight, (b) means responsive to the pattern to be recognized for providing a plurality of summations, each corresponding to the successive addition of certain of the numerical weights in different ones of said sets of storage means, (c) means for storing a plurality of numerical biasing weights, (d) means for adding different ones of said biasing weights separately to different ones of the summations to produce a plurality of resultant summations corresponding to different ones of said summations, and (e) means responsive to each of said resultant summations for providing a plurality of binary outputs, each being a different order digit of a binary number representing said pattern.

13. The invention as set forth in claim 12, comprising means for comparing each of said resultant summations with outputs representing two different numerical values and for providing a plurality of outputs indicative of said resultant summations being in a range between said two values.

14. A system for classifying each of a plurality of patterns which is composed of arbitrarily arranged binary elements, said system comprising (a) a plurality of sets of means having storage for numerical weights, each set corresponding to a different one of said binary elements, (b) means for summing the numerical values of all sets of weights which correspond to those elements which are conditioned in a pre-determined one of their binary states whereby to provide a plurality of summations, (c) means having storage for a plurality of numerical biasing weights, (d) means for including in each summation a different one of said plurality of biasing numerical weights sufficient to change the value of each said summation to be either greater than or less than a predetermined threshold number, and (e) means responsive to said summations, including said biasing weights, for providing for each of them binary bits having one binary value when said last-named summations are above said threshold and the opposite binary value when said last-named summations are below said threshold, whereby the bits corresponding to said different ones of said summations constitute a different order digit of a binary number representing said patterns.

15. The invention as set forth in claim 14, comprising means for comparing each of said summations with different ones of two numerical values which are different from each other for providing an output signal when said summation has a value between said two threshold values.

References Cited by the Examiner

UNITED STATES PATENTS

| | | | |
|---|---|---|---|
| 2,894,684 | 7/1959 | Nettleton | 235—92 |
| 3,040,984 | 6/1962 | Cox | 235—92 |
| 3,045,911 | 7/1962 | Russell | 235—151 |
| 3,069,079 | 12/1962 | Steinbuch | 340—146.3 |
| 3,104,369 | 9/1963 | Rabinow et al. | 340—146.3 |
| 3,106,699 | 10/1963 | Kamentsky | 340—146.3 |
| 3,167,745 | 1/1965 | Bryan et al. | 340—146.3 |

OTHER REFERENCES

Arneth: "Counter Failure Detector," IBM Tech. Dis. Bull., vol. 2, No. 3, October 1959, pp. 88–89.

MAYNARD R. WILBUR, *Primary Examiner.*

MALCOLM A. MORRISON, DARYL W. COOK, *Examiners.*

J. S. IANDIORIO, J. E. SMITH, *Assistant Examiners.*